(12) United States Patent
Brolin

(10) Patent No.: US 9,379,938 B2
(45) Date of Patent: Jun. 28, 2016

(54) METHOD AND SYSTEM FOR SOAM FLOW SWITCHING

(75) Inventor: Stephen J. Brolin, Livingston, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 796 days.

(21) Appl. No.: 13/076,119

(22) Filed: Mar. 30, 2011

(65) Prior Publication Data
US 2012/0254672 A1 Oct. 4, 2012

(51) Int. Cl.
*H04L 12/24* (2006.01)

(52) U.S. Cl.
CPC ........ *H04L 41/0668* (2013.01); *H04L 41/0213* (2013.01)

(58) Field of Classification Search
CPC ....................................................... H04L 45/28
USPC .................................. 370/216–218, 228, 230
See application file for complete search history.

(56) References Cited

U.S. PATENT DOCUMENTS

| | | | | |
|---|---|---|---|---|
| 2006/0291378 A1* | 12/2006 | Brotherston et al. | ......... | 370/221 |
| 2009/0073988 A1* | 3/2009 | Ghodrat et al. | .......... | 370/395.53 |
| 2010/0220724 A1 | 9/2010 | Rabie et al. | | |
| 2010/0306489 A1* | 12/2010 | Abts et al. | ..................... | 711/163 |
| 2011/0051723 A1 | 3/2011 | Rabie et al. | | |

OTHER PUBLICATIONS

United States Office Action; U.S. Appl. No. 13/076,009; pp. 23, Aug. 16, 2013.
United States Final Office Action; U.S. Appl. No. 13/076,097; pp. 21, Oct. 9, 2013.
United States Final Office Action; U.S. Appl. No. 13/076,097; pp. 10, May 14, 2014.
United States Final Office Action; U.S. Appl. No. 13/076,009; pp. 32, Mar. 28, 2014.

* cited by examiner

*Primary Examiner* — Hassan Kizou
*Assistant Examiner* — Ashil Farahmand
(74) *Attorney, Agent, or Firm* — Baker Botts L.L.P.

(57) ABSTRACT

According to one embodiment, a method may include generating a first plurality of Service Operation, Administration, and Management (SOAM) flows intended for a working port and a second plurality of SOAM flows intended for a protection port, wherein the working port and the protection port form a link aggregation group, determining whether each of the working port and the protection port is an active port or an inactive port, dropping all of the first plurality of SOAM flows if the working port is the inactive port, communicating all of the first plurality of SOAM flows to the working port if the working port is the active port, dropping all of the second plurality of SOAM flows if the protection port is the inactive port, and communicating all of the second plurality of SOAM flows to the protection port if the protection port is the active port.

20 Claims, 5 Drawing Sheets

METHOD AND SYSTEM FOR SOAM FLOW SWITCHING

TECHNICAL FIELD OF THE DISCLOSURE

The present disclosure relates generally to networked communications and, more particularly, to a method and system for Service Operation, Administration, and Management (SOAM) flow switching.

BACKGROUND

A communication network may include network elements that route packets and/or frames through the network. Some network elements may include a distributed architecture, wherein frame processing may be distributed among several subsystems of the network element (e.g., line cards, switches, and traffic managers). In some instances, a network element used in a communication network may be a multi-function Ethernet aggregation network element. A multi-function Ethernet aggregation network element may be one which supports many functions, including without limitation link aggregation, virtual local area network (VLAN) detection, and traffic management/shaping.

A multi-function Ethernet aggregation network element may include a distributed architecture including one or more plug-in units (PIUs). A PIU may comprise a modular electronic device that provides any suitable network communication functionality. For example, a PIU may include, among other things, an switch (e.g., an Ethernet switch) for switching traffic through the network element.

SUMMARY

According to one embodiment, a method may include generating a first plurality of Service Operation, Administration, and Management (SOAM) flows intended for a working port and a second plurality of SOAM flows intended for a protection port, wherein the working port and the protection port form a link aggregation group, determining whether each of the working port and the protection port is an active port or an inactive port, dropping all of the first plurality of SOAM flows if the working port is the inactive port, communicating all of the first plurality of SOAM flows to the working port if the working port is the active port, dropping all of the second plurality of SOAM flows if the protection port is the inactive port, and communicating all of the second plurality of SOAM flows to the protection port if the protection port is the active port.

One or more other technical advantages of the disclosure may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
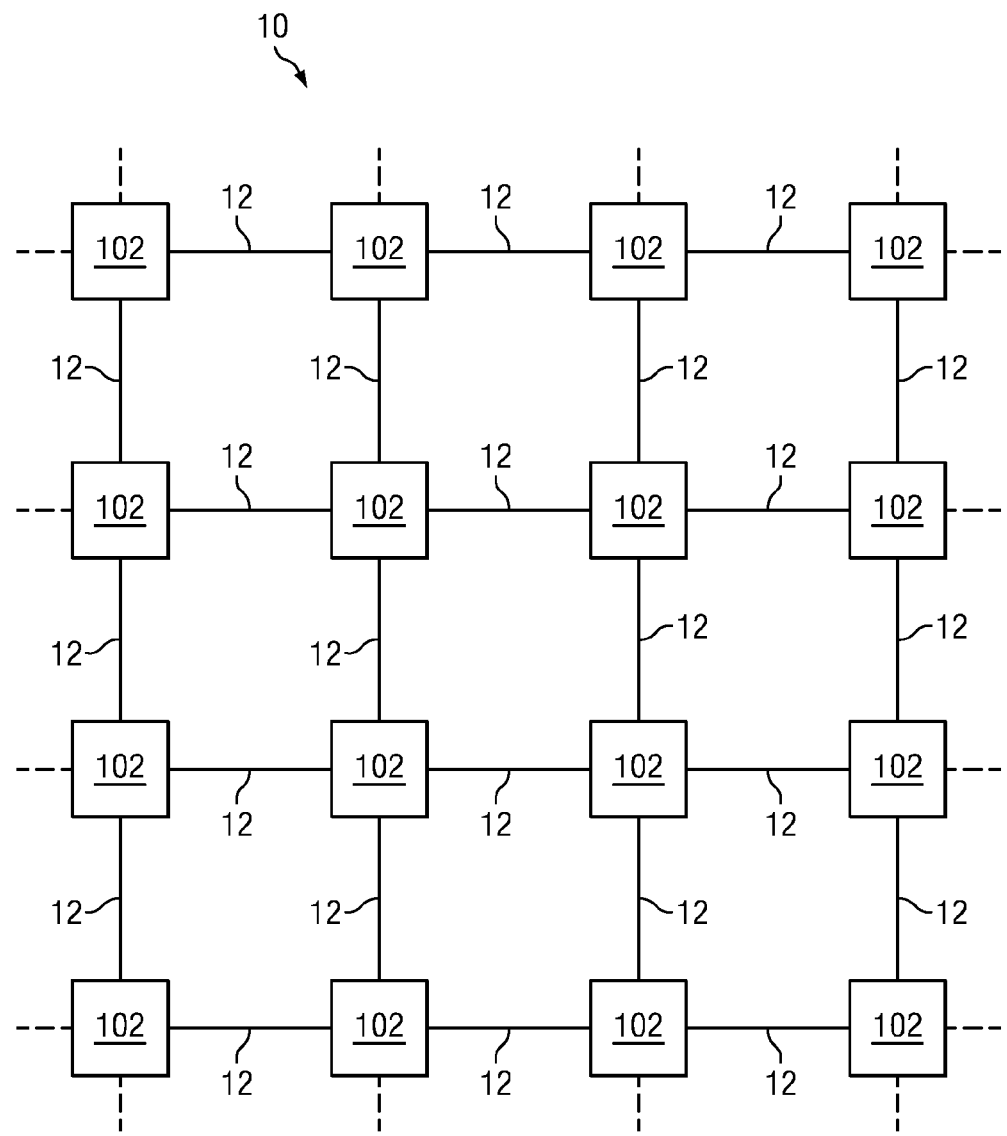
FIG. 1 illustrates a block diagram of an example communication network, in accordance with certain embodiments of the present disclosure.

FIG. 1 illustrates a block diagram of an example communication network 10, in accordance with certain embodiments of the present disclosure. Network 10 may include one or more transmission media 12 operable to transport one or more signals communicated by components of network 10. In certain embodiments, network 10 may carry Ethernet signals. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network elements 102 to each other and communicate information between corresponding network elements 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Ethernet communication protocol and the Internet Protocol (IP). Additionally, the traffic communicated in network 10 may be structured in any appropriate manner including, but not limited to, being structured in frames, packets, or an unstructured bit stream. As used herein, a "flow" may mean a sequence of packets, frames, cells, or any other segments of data communicated over a network.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

Figure 2:
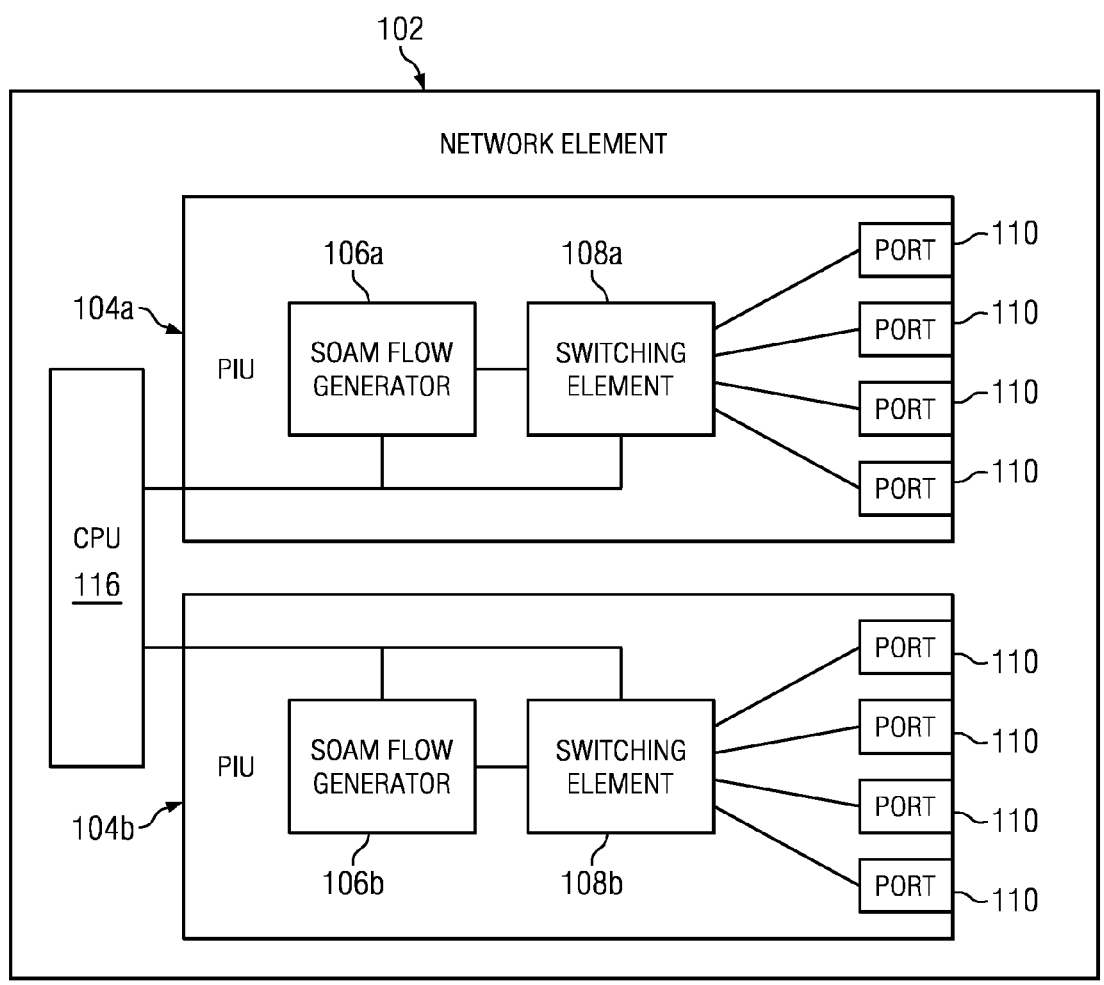
FIG. 2 illustrates a block diagram of certain embodiments of a network element, in accordance with certain embodiments of the present disclosure.

FIG. 2 illustrates a block diagram of certain embodiments of network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device coupled to network element 102 (e.g., another network element 102 or one or more devices or clients coupled to the network element 102).

As depicted in FIG. 2, a network element 102 may include a central processing unit (CPU) 116 and a plurality of plug-in units (PIU) 104 with a plurality of ports 110. In some embodiments, ports 110 may be coupled to other components within network element 102. For example, an optical receiver in network element 102 may receive traffic in optical form from an optical transmission media 12 and convert the traffic into electrical form, allowing the traffic to be communicated from the optical receiver to PIU 104 via port 110.

CPU may include any suitable system, apparatus, or device configured to manage network element 102, including management of routing of data between ports 110. CPU 116 may maintain a routing table in accordance with open shortest path first (OSPF) protocol, intermediate system-intermediate system (ISIS) protocol, or any other suitable protocol, wherein such routing table may include any table, database, file, or other data structure configured to maintain information relating a particular ingress port 110 to a corresponding egress port 110.

A PIU 104 may include any system, device, or apparatus having plug-in terminals so that some or all electrical connections of the PIU 104 can be made engaging the unit with a suitable socket of network element 102. A PIU may include any system, device, or apparatus or combination thereof to implement networking functions. As shown in FIG. 2, one example of a PIU 104 may include a switching element 108, a Service Operation, Administration, and Management (SOAM) flow generator 106, and a plurality of ports 110.

A switching element 108 may include any suitable system, apparatus, or device configured to receive ingressing traffic via a port 110 and route such traffic to a particular egress port 110 based on analyzing the contents of the data (e.g., a destination address of a packet of traffic).

In certain embodiments of network 10, a network element 102 may include functions according to SOAM standards. SOAM is defined by IEEE 802.1ag and is often used to diagnose and monitor an Ethernet service after the service has been instantiated between network elements 102. SOAM flows may comprise a sequence of continuity check message (CCM) frames that may be communicated between network elements 102 in a network path to verify the continuity of the network path. As depicted in FIG. 2, a SOAM flow generator 106 may generate a plurality of SOAM flows and communicate those SOAM flows to switching element 108, which may in turn send the plurality of SOAM flows to the appropriate port 110 for transmission across the network path they are configured to monitor.

A port 110 may be communicatively coupled to a switching element 104 and may include any suitable system, apparatus, or device configured to serve as an interface between a switching element 104 and other devices within network element 102. A port 110 may be implemented using hardware, software, or any combination thereof. For example, a port 110 may comprise an Ethernet port or any other suitable port.

Two or more ports 110 may be grouped into a link aggregation group (LAG). Link aggregation (e.g., IEEE 802.1AX-2008) may increase link bandwidth beyond the limits of any one single port and provide redundancy for higher reliability. In link aggregation, any suitable number of member ports 110 may be grouped and represented as a single logical port to other components of the network system. Various switching network elements of the network may "see" the aggregated ports in the LAG as a single logical communication port in the routing tables or databases of the network elements.

In addition to enhancing link bandwidth between network elements 102, a LAG may provide link-level protection to network 10 by providing link-level redundancy. Link-OAM (LOAM) flows may be used to verify continuity of a communication path. For example, a LOAM flow may be communicated from one network element 102 to an adjacent network element 102 via "working" port 110. If a failure of a LOAM flow is detected, traffic over a LAG may be switched according to Link Aggregation Control Protocol (LACP), and traffic and management flows may be redirected to "protection" port 110. For the purposes of the present disclosure, the reallocation of resources in a LAG according to LACP may be referred to as a "LAG switchover."

In addition to link-level protection, network 10 may include flow-level VLAN protection according to the G.8031 standard. Where as link aggregation may provide redundancy between any two communicatively adjacent network elements 102, flow level VLAN protection may provide redundant network paths between the start and end points of VLAN flows that may span many network elements 102. SOAM flows may be used to verify the continuity of a flow path for a single VLAN flow or a protected group of VLAN flows. A failure of a SOAM flow may trigger a flow-level protection switchover from VLAN flows along the failed network path to corresponding redundant VLAN flows carrying the same information on a redundant path. An example technique of communicating SOAM flows during a link-level LAG switchover is described below in conjunction with FIGS. 3A and 3B.

Figure 3A:
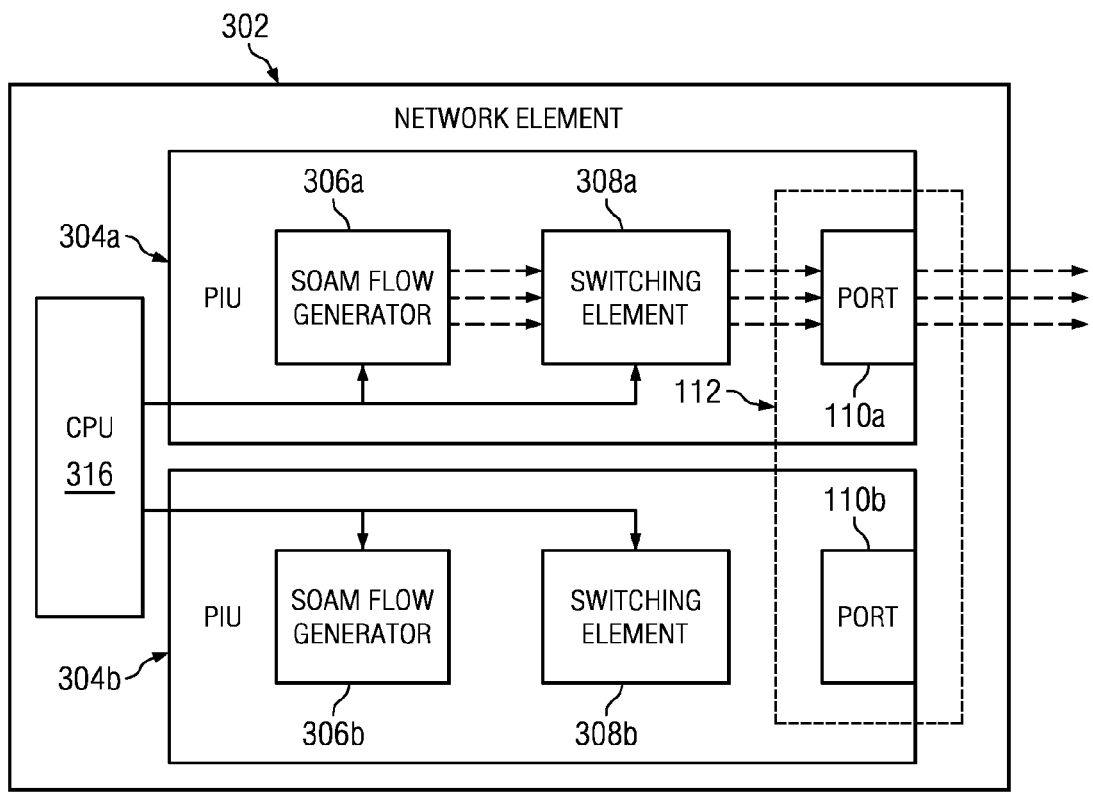
FIG. 3A illustrates an example of a network element generating SOAM flows prior to a LAG switchover.

FIG. 3A illustrates an example of a network element 302 generating SOAM flows prior to a LAG switchover. In network element 302, port 110a may represent the "working" port of LAG 112, and port 110b may represent the "protection" port of LAG 112. As illustrated in FIG. 3A, CPU 316 may be communicatively coupled to PIU 304a and PIU 304b. Prior to a LAG switchover, CPU 316 may instruct SOAM flow generator 306a to generate a plurality of SOAM flows and to communicate the plurality of SOAM flows to switching element 308a. CPU 316 may instruct switching element 308a to pass the plurality of SOAM flows to working port 110a for egress from network element 302. During this time, CPU 316 does not instruct SOAM flow generator 306b to generate SOAM flows. Thus, SOAM flows are not communicated to protection port 110b.

Figure 3B:
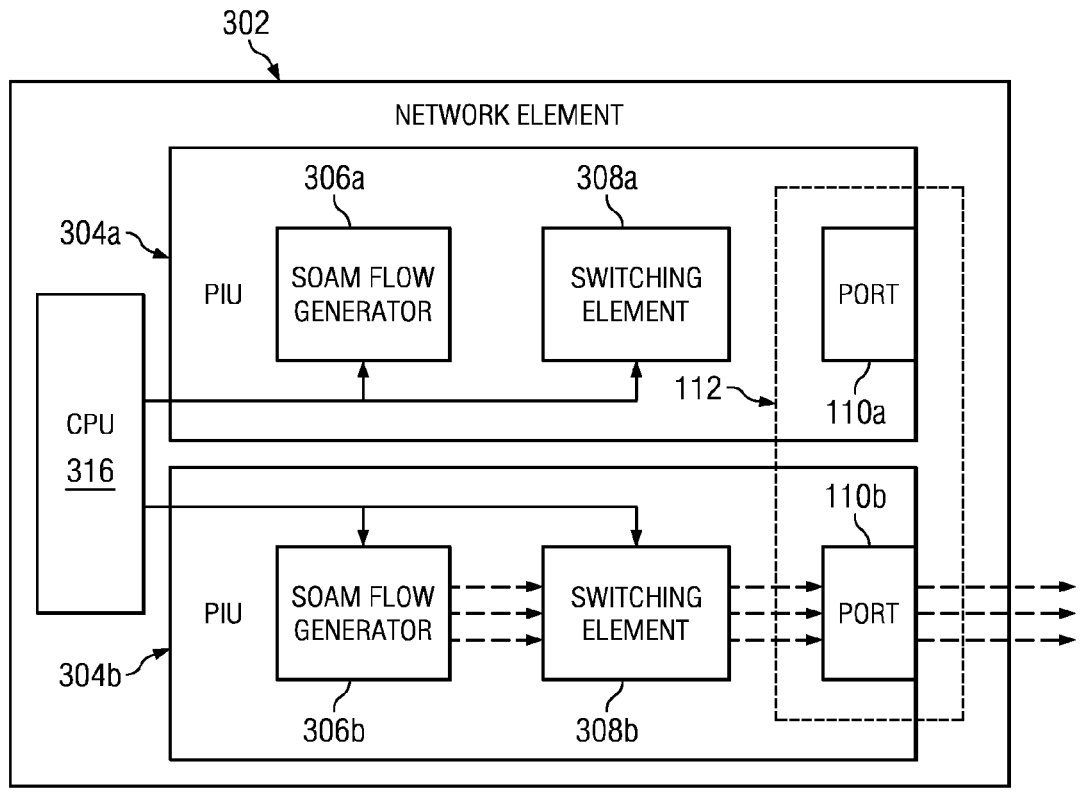
FIG. 3B illustrates an example of a network element generating SOAM flows after a LAG switchover.

FIG. 3B illustrates an example of network element 302 generating SOAM flows after a LAG switchover. In network element 302, port 110a may represent the "working" port of LAG 112, and port 110b may represent the "protection" port of LAG 112. When a LAG switchover occurs, network traffic as well as SOAM flows may be moved from working port 110a to protection port 110b. Accordingly, CPU 316 may instruct SOAM flow generator 306a to stop generating the plurality of SOAM flows, and may instruct SOAM generator 306b to begin generating a plurality of SOAM flows. The SOAM flows generated by SOAM flow generator 306b may be functionally equivalent to the SOAM flows generated by SOAM flow generator 306a as the pluralities of SOAM flows are configured to replace one another after LAG switchovers. CPU 316 may further instruct SOAM flow generator 306b to communicate the plurality of SOAM flows to switching element 308b. CPU 316 may instruct switching element 308b to pass the plurality of SOAM flows to protection port 110b for egress from network element 302.

The switchover of SOAM flows described in conjunction with FIGS. 3A and 3B allows the flow-level path monitoring to continue despite a link-level switch of resources in LAG 112. However, a switchover of SOAM flows as described above may cause a loss of multiple CCM frames in SOAM flows at the endpoint of the protected flow path. A network element 302 may be configured to handle, for example, four hundred or more protected groups of VLAN flows or any other suitable number. The protected groups of VLAN flows may comprise, for example, four thousand or more individual VLAN flows, or any other suitable number. SOAM flows may be generated for individual VLAN flows or for protected groups of VLAN flows. Accordingly, a network element may be required to handle a large number (e.g., four hundred to four thousand) or any other suitable number of SOAM flows during a LAG switchover. CPU 316 may require a large number of clock cycles to instruct the switchover of each individual SOAM flow from SOAM flow generator 306a to SOAM flow generator 306b. If the time to perform the SOAM flow switchover causes a loss of multiple CCM frames for a SOAM flow, a false alarm may be triggered. The false alarm may cause a needless flow-level switchover from VLAN flows along the network path with the false alarm to corresponding VLAN flows carrying the same information on a redundant path.

In the present disclosure, to prevent false alarms at the flow level caused by gaps in SOAM flows during a LAG switchover, a plurality of SOAM flow generators and switching elements may be configured such that a single command may instruct the switchover of a large number of SOAM flows during a LAG switchover.

Figure 4A:
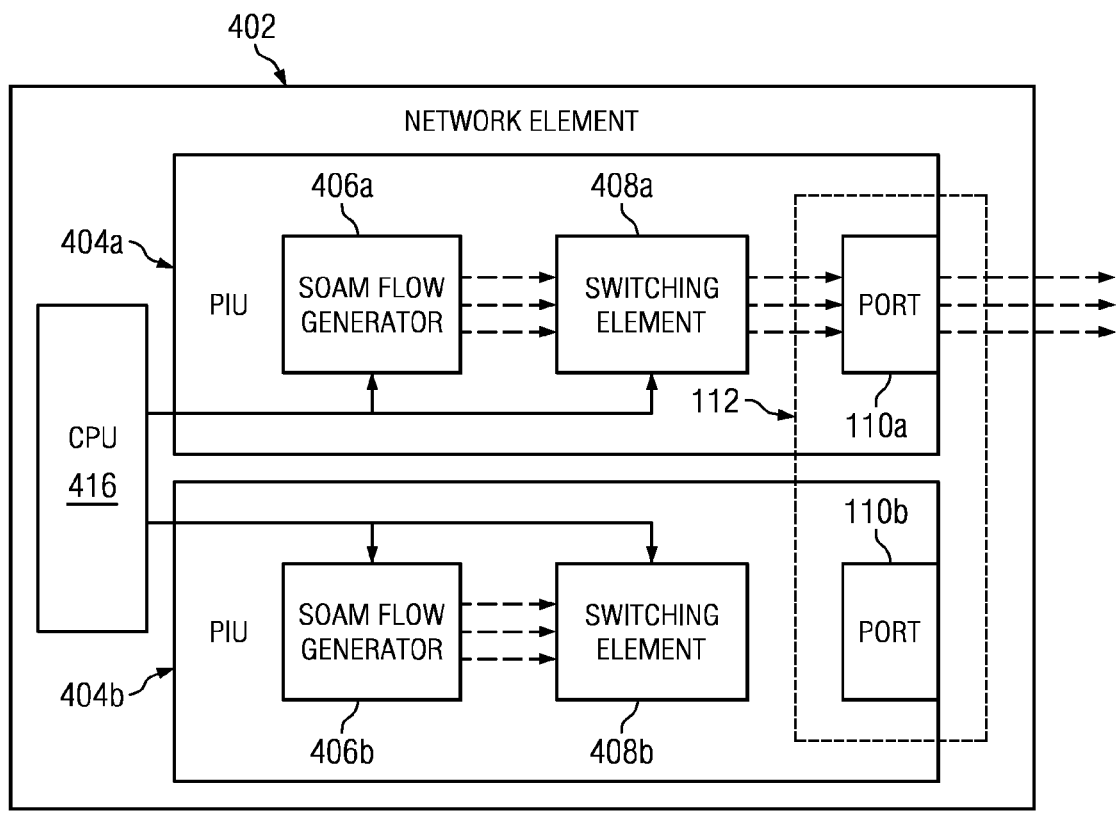
FIG. 4A illustrates an example embodiment of a network element including SOAM flow paths prior to a LAG switchover, in accordance with certain embodiments of the present disclosure.
Figure 4B:
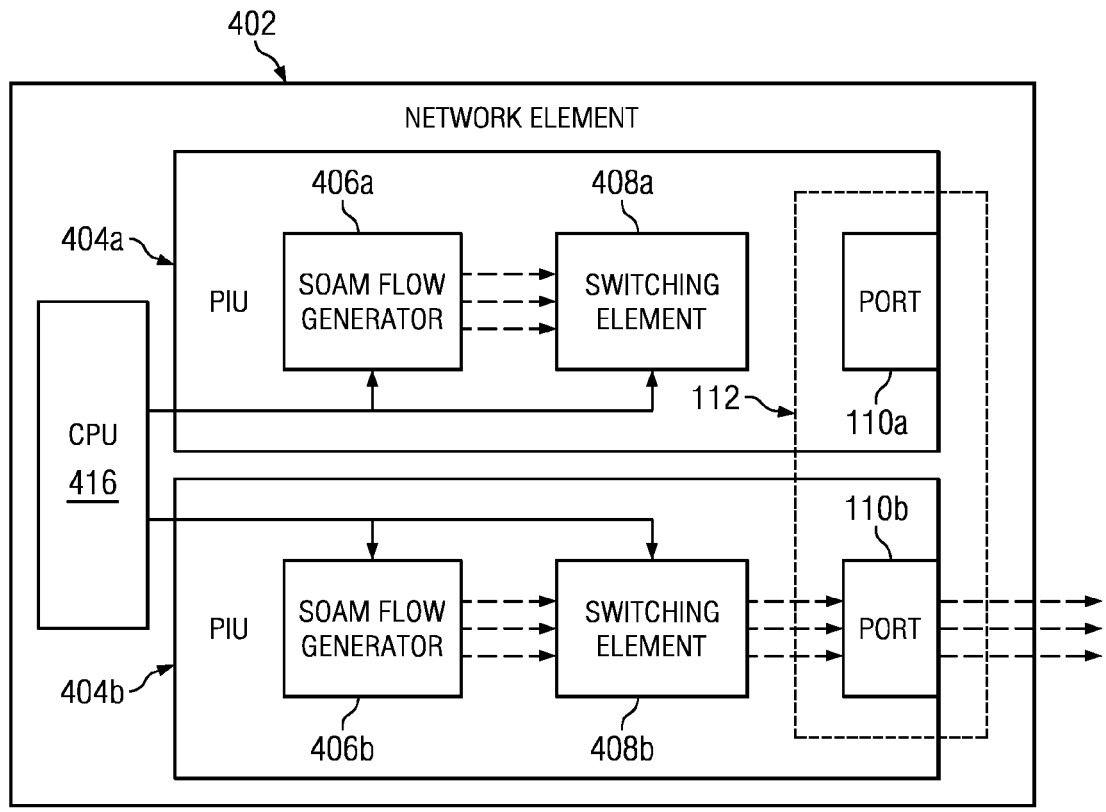
FIG. 4B illustrates an example embodiment of a network element including SOAM flow paths after a LAG switchover, in accordance with certain embodiments of the present disclosure.

FIG. 4A illustrates an example embodiment of network element 402 including SOAM flow paths prior to a LAG switchover, according to certain embodiments of the present disclosure. FIG. 4B illustrates an example embodiment of network element 402 including SOAM flow paths after a LAG switchover, according to certain embodiments of the present disclosure. In some embodiments, the functional blocks illustrated in FIGS. 4A and 4B may be implemented partially or fully in software, firmware, hardware, or in combinations thereof. Network element 402 may include processors and/or other integrated circuits that may be configured to execute such software or firmware.

As illustrated in FIGS. 4A and 4B, CPU 416 may instruct both SOAM flow generator 406a and SOAM flow generator 406b to continuously generate a plurality of SOAM flows and to respectively communicate the pluralities of SOAM flows to switching element 408a and switching element 408b respectively. The SOAM flows generated by SOAM generator 406b may be functionally equivalent to the SOAM flows generated by SOAM flow generator 406a as the two pluralities of SOAM flows are configured to replace one another after LAG switchovers. When no fault is detected on the link associated with working port 110a, working port 110a may be designated as the active port in LAG 112 and protection port 110b may be designated as the inactive port in LAG 112. Accordingly, as illustrated in FIG. 4A, CPU 416 may instruct switching element 408a to communicate each of the plurality of flows from SOAM flow generator 406a to working port 110a for egress from network element 402. At the same time, CPU 416 may instruct switching element 408b to drop each of the plurality of flows from SOAM flow generator 406b.

If a fault is detected on the link associated with working port 110a, a LAG switchover may occur according to LACP. When a fault is detected on working port 110a, working port 110a may be designated as the inactive port in LAG 112 and protection port 110b may be designated as the active port in LAG 112. Accordingly, as illustrated in FIG. 4B, CPU 416 may instruct switching element 408b to communicate each of the plurality of flows from SOAM flow generator 406b to protection port 110b for egress from network element 402. At the same time, CPU 416 may instruct switching element 408a to drop each of the plurality of flows from SOAM flow generator 406a.

As illustrated in FIGS. 4A and 4B, the switchover of SOAM flows during a LAG switchover may occur based on one CPU command to switching element 408a and one CPU command to switching element 404b. Accordingly, the switchover of SOAM flows during a LAG switchover may occur quickly, the loss of CCM frames may either be avoided or minimized to a number of lost CCM frames that would not trigger a false alarm. For example, in some embodiments where three consecutive lost CCM frames may generate an alarm, the number of lost CCM frames due to a LAG switchover may be minimized to two or less CCM frames. Thus, false alarms may be prevented and needless flow-level switchovers from VLAN flows along a network path with a false alarm to corresponding VLAN flows carrying the same information on a redundant path may also be avoided.

Figure 5:
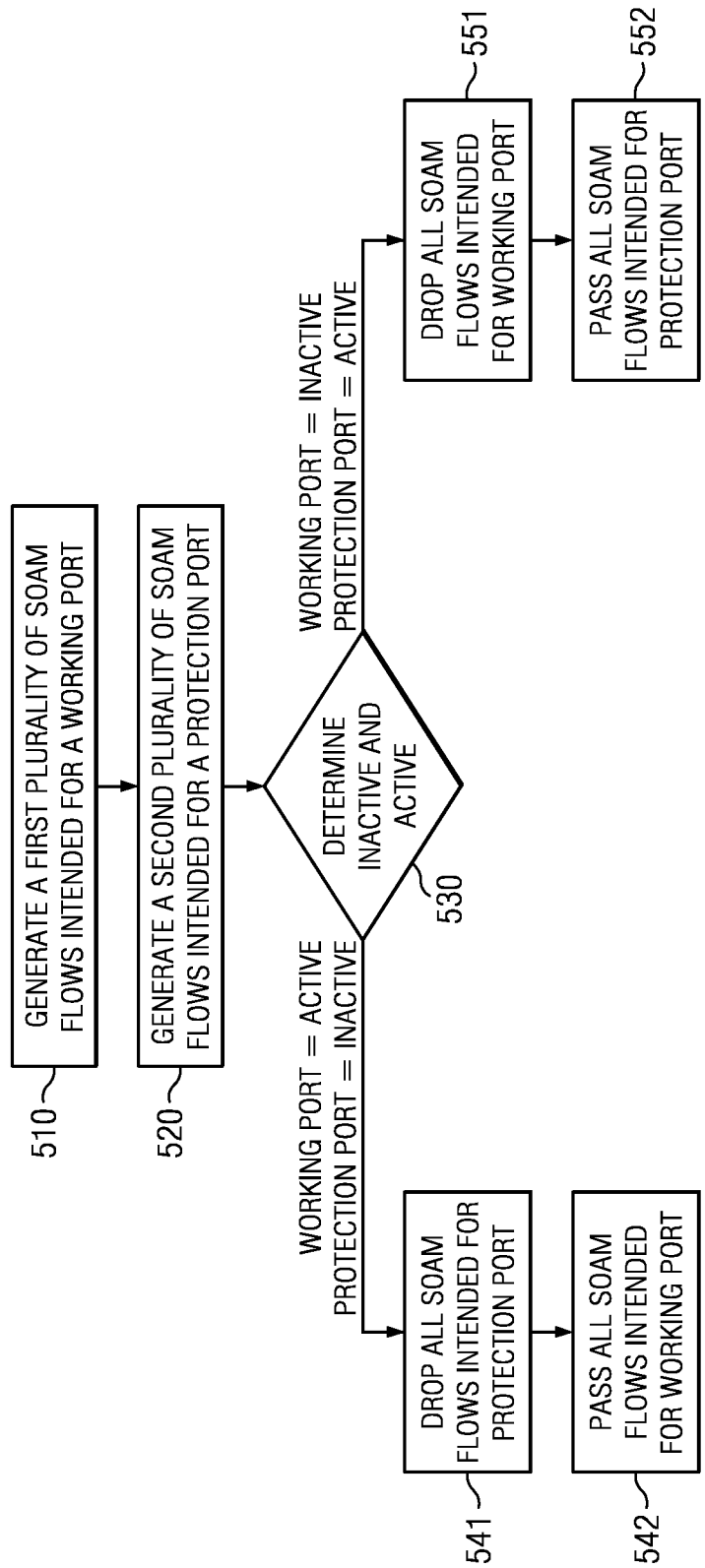
FIG. 5 illustrates a flow chart depicting an example method for switching SOAM flows during a LAG switchover, in accordance with certain embodiments of the present disclosure.

FIG. 5 illustrates a flow chart depicting an example method 500 for switching SOAM flows during a LAG switchover, in accordance with certain embodiments of the present disclosure.

At step 510, SOAM flow generator 406a may generate a first plurality of SOAM flows intended for working port 110a.

At step 520, SOAM flow generator 406b may generate a second plurality of SOAM flows intended for protection port 110b.

At step 530, CPU 416 may determine whether each of the working port 110a and the protection port 110b is an active port or an inactive port. During normal operation when no fault is detected on the link associated with working port 110a, working port 110a may be designated as the active port and protection port 110b may be designated as the inactive port. On the other hand, when a fault is detected on the link associated with working port 110a, protection port 110b may be designated as the active port and working port 110a may be designated as the inactive port. If working port 110a is the active port and protection port 110b is the inactive port, method 500 may proceed to step 541. Alternatively, if protection port 110b is the active port and working port 110a is the inactive port, method 500 may proceed to step 551.

At step 541, CPU 416 may instruct switching element 408b to drop all of the second plurality of SOAM flows intended for protection port 110b, which has been designated as the inactive port. At step 542, CPU 416 may instruct switching element 408a to communicate to working port 110a all of the first plurality of SOAM flows intended for working port 110a, which has been designated the active port.

At step 551, CPU 416 may instruct switching element 408a to drop all of the first plurality of SOAM flows intended for working port 110a, which has been designated as the active port. At step 552, CPU 416 may instruct switching element 408b to communicate, to protection port 110b, all of the second plurality of SOAM flows intended for protection port 110*b*, which has been designated the active port.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. For example, logic may perform the functions of SOAM flow generators 406*a-b*, switching elements 408*a-b*, and ports 110*a-b* on PIUs 404*a-b*, as well as CPU 416. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   generating a first plurality of Service Operation, Administration, and Management (SOAM) flows intended for a working port and a second plurality of SOAM flows intended for a protection port, wherein the working port and the protection port form a link aggregation group and are located on different plug-in units of a network element;
   the first plurality of SOAM flows comprising (i) at least one SOAM flow used to verify the continuity of a first network path utilized by a protected group of virtual local area network (VLAN) flows and (ii) at least one SOAM flow used to verify the continuity of a second network path utilized by a redundant group of VLAN flows corresponding to the protected group of VLAN flows;
   the second plurality of SOAM flows comprising (i) at least one SOAM flow used to verify the continuity of the first network path utilized by the protected group of VLAN flows and (ii) at least one SOAM flow used to verify the continuity of the second network path utilized by the redundant group of VLAN flows;
   determining whether each of the working port and the protection port is an active port or an inactive port;
   dropping all of the plurality of SOAM flows intended for the inactive port; and
   communicating to the active port all of the plurality of SOAM flows intended for the active port.

2. The method of claim 1, wherein:
   a central processing unit (CPU) instructs a first switching element to drop all of the first plurality of SOAM flows with a first command;
   the CPU instructs the first switching element to communicate all of the first plurality of SOAM flows to the working port with a second command;
   the CPU instructs a second switching element to drop all of the second plurality of SOAM flows with a third command; and
   the CPU instructs the second switching element to communicate all of the second plurality of SOAM flows to the protection port with a fourth command.

3. The method of claim 1, wherein the working port is the active port and the protection port is the inactive port under normal operation.

4. The method of claim 1, wherein the working port is the inactive port and the protection port is the active port if a fault is detected on a link associated with the working port.

5. The method of claim 4, wherein the fault is detected based on the failure of a Link OAM (LOAM) flow.

6. The method of claim 1, wherein a SOAM flow comprises a sequence of continuity check message (CCM) frames used to verify the continuity of the first network path utilized by the protected group of VLAN flows.

7. The method of claim 6, wherein a series of missing CCM frames at a destination network element triggers a flow-level protection switchover from the protected group of VLAN flows on the first network path to the corresponding redundant group of VLAN flows on the second network path.

8. A network element comprising:
   a first plug-in unit (PIU) comprising a first SOAM generator configured to generate a first plurality of Service Operation, Administration, and Management (SOAM) flows intended for a working port of the first PIU, the first plurality of SOAM flows comprising (i) at least one SOAM flow used to verify the continuity of a first network path utilized by a protected group of virtual local area network (VLAN) flows and (ii) at least one SOAM flow used to verify the continuity of a second network path utilized by a redundant group of VLAN flows corresponding to the protected group of VLAN flows;
   a second PIU comprising a second SOAM generator configured to generate a second plurality of SOAM flows intended for a protection port of the second PIU, the second plurality of SOAM flows comprising (i) at least one SOAM flow used to verify the continuity of the first network path utilized by the protected group of VLAN flows and (ii) at least one SOAM flow used to verify the continuity of the second network path utilized by the redundant group of VLAN flows, wherein the working port and the protection port form a link aggregation group;

a central processing unit configured to determine whether each of the working port and the protection port is an active port or an inactive port;

a first switching element of the first PIU configured to:
  communicate all of the first plurality of SOAM flows to the working port if the working port is the active port; and
  drop all of the first plurality of SOAM flows if the working port is the inactive port; and a second switching element of the second PIU configured to:
  communicate all of the second plurality of SOAM flows to the protection port if the protection port is the active port; and
  drop all of the second plurality of SOAM flows if the protection port is the inactive port.

9. The network element of claim 8, wherein the CPU is further configured to:
  instruct the first switching element to communicate all of the first plurality of SOAM flows to the working port with a first command;
  instruct the first switching element to drop all of the first plurality of SOAM flows with a second command;
  instruct the second switching element to communicate all of the second plurality of SOAM flows to the protection port with a third command; and
  instruct the second switching element to drop all of the second plurality of SOAM flows with a fourth command.

10. The network element of claim 8, wherein the working port is the active port and the protection port is the inactive port under normal operation.

11. The network element of claim 8, wherein the working port is the inactive port and the protection port is the active port if a fault is detected on a link associated with the working port.

12. The network element of claim 11, wherein the fault is detected based on the failure of a Link OAM (LOAM) flow.

13. The network element of claim 8, wherein a SOAM flow comprises a sequence of continuity check message frames used to verify the continuity of the first network path utilized by the protected group of VLAN flows.

14. The network element of claim 13, wherein a series of missing CCM frames at a destination network element triggers a flow-level protection switchover from the protected group of VLAN flows on the first network path to the corresponding redundant group of VLAN flows on the second network path.

15. A non-transitory computer readable medium embodying logic operable, when executed by a processor, to:
  generate a first plurality of Service Operation, Administration, and Management (SOAM) flows intended for a working port and a second plurality of SOAM flows intended for a protection port, wherein the working port and the protection port form a link aggregation group and are located on different plug-in units of a network element;
  the first plurality of SOAM flows comprising (i) at least one SOAM flow used to verify the continuity of a first network path utilized by a protected group of virtual local area network (VLAN) flows and (ii) at least one SOAM flow used to verify the continuity of a second network path utilized by a redundant group of VLAN flows corresponding to the protected group of VLAN flows;
  the second plurality of SOAM flows comprising (i) at least one SOAM flow used to verify the continuity of the first network path utilized by the protected group of VLAN flows and (ii) at least one SOAM flow used to verify the continuity of the second network path utilized by the redundant group of VLAN flows;
  determine whether each of the working port and the protection port is an active port or an inactive port;
  drop all of the plurality of SOAM flows intended for the inactive port; and
  communicate to the active port all of the plurality of SOAM flows intended for the active port.

16. The non-transitory computer readable medium of claim 15, further operable, when executed, to:
  instruct a first switching element to communicate all of the first plurality of SOAM flows to the working port with a first command;
  instruct the first switching element to drop all of the first plurality of SOAM flows with a second command;
  instruct the second switching element to communicate all of the second plurality of SOAM flows to the protection port with a third command; and
  instruct the second switching element to drop all of the second plurality of SOAM flows with a fourth command.

17. The non-transitory computer readable medium of claim 15, wherein:
  the working port is the active port and the protection port is the inactive port under normal operation; and
  the working port is the inactive port and the protection port is the active port if a fault is detected on a link associated with the working port.

18. The non-transitory computer readable medium of claim 17, wherein the fault is detected based on the failure of a Link OAM (LOAM) flow.

19. The non-transitory computer readable medium of claim 15, wherein a SOAM flow comprises a sequence of continuity check message (CCM) frames used to verify the continuity of the first network path utilized by the protected group of VLAN flows.

20. The non-transitory computer readable medium of claim 15, wherein a series of missing CCM frames at a destination network element triggers a flow-level protection switchover from the protected group of VLAN flows on the first network path to the corresponding redundant group of VLAN flows on a the second network path.

* * * * *